United States Patent
Hattori et al.

(10) Patent No.: US 7,220,974 B2
(45) Date of Patent: May 22, 2007

(54) FLUORESCENCE DETECTION APPARATUS AND METHOD FOR EXCITATION LIGHT IRRADIATION TIMING

(75) Inventors: Toshiyuki Hattori, Tokyo (JP); Yujin Arai, Tokyo (JP)

(73) Assignee: Olympus Corporation, Tokyo (JP)

( * ) Notice: Subject to any disclaimer, the term of this patent is extended or adjusted under 35 U.S.C. 154(b) by 227 days.

(21) Appl. No.: 11/128,137

(22) Filed: May 11, 2005

(65) Prior Publication Data

US 2005/0253088 A1  Nov. 17, 2005

(30) Foreign Application Priority Data

May 17, 2004  (JP) ............... 2004-146528

(51) Int. Cl.
*G02B 21/00* (2006.01)
(52) U.S. Cl. .................. 250/458.1; 356/317; 356/308; 356/326; 250/472.1
(58) Field of Classification Search .............. 250/472.1
See application file for complete search history.

(56) References Cited

U.S. PATENT DOCUMENTS 5,500,536 A * 3/1996 Nogami et al. .......... 250/458.1
6,977,724 B2 * 12/2005 Knebel .................. 356/317
7,167,292 B2 * 1/2007 Yoshida ................ 359/227
2002/0021440 A1  2/2002 Knebel

FOREIGN PATENT DOCUMENTS

JP  8-43739 A  2/1996
JP  2002-122787 A  4/2002

* cited by examiner

*Primary Examiner*—Albert J. Gagliardi
*Assistant Examiner*—Djura Malevic
(74) *Attorney, Agent, or Firm*—Frishauf, Holtz, Goodman & Chick, P.C.

(57) ABSTRACT

A fluorescence detection apparatus irradiates a sample with an excitation light having different wavelengths, spectrally detects fluorescence from the sample, and includes: a comparison unit for comparing the wavelength of the excitation light with the starting wavelength of a fluorescent spectrum detection bandwidth; and a determination unit for determining an excitation light irradiation timing such that the irradiation of the excitation wavelength is stopped when the wavelength of the excitation light is longer than the starting wavelength.

9 Claims, 6 Drawing Sheets

| TYPE OF IMAGE | WAVELENGTH CONTAINED IN IMAGE |
|---|---|
| FIRST IMAGE | 490nm OR MORE, LESS THAN 510nm |
| SECOND IMAGE | 510nm OR MORE, LESS THAN 530nm |
| THIRD IMAGE | 530nm OR MORE, LESS THAN 550nm |
| FOURTH IMAGE | 550nm OR MORE, LESS THAN 570nm |
| FIFTH IMAGE | 570nm OR MORE, LESS THAN 590nm |

FLUORESCENCE DETECTION APPARATUS AND METHOD FOR EXCITATION LIGHT IRRADIATION TIMING

CROSS REFERENCE TO RELATED APPLICATION

This plurality of claims benefit of Japanese Patent Application No. 2004-146528, filed on May 17, 2004, the contents of which are incorporated by this reference.

BACKGROUND OF THE INVENTION

1. Field of the Invention

The present invention relates to a fluorescence detection apparatus for observing the fluorescence from a sample dyed with two or more different fluorescent dyes on a fluorescent tagged sample.

2. Description of the Related Art

In the conventional life science field, the observation of fluorescence from a fluorescent tagged sample has been widely performed. In the fluorescence observation, incident-light illumination is commonly used. In the incident-light illumination, a excitation light does not directly enter the optical path for detection of fluorescence, but the excitation light reflected or scattered by a sample or an optical system is mixed into the optical path for detection. Generally, since an excitation light is much stronger than fluorescence, it is difficult to detect the fluorescence when the slightest excitation light is mixed. Therefore, it is necessary to completely separate the fluorescence from the excitation light.

A method of detecting fluorescence, a method of obtaining fluorescence in a desired wavelength range by cutting off unnecessary light such as an excitation light, etc. using an optical filter at a stage preceding a photodetector is used. In this case, the optical filter separates an excitation light from fluorescence based on the difference in wavelength.

Recently, since fluorescent dyes_and fluorescent protein having various fluorescent spectra_have been sequentially developed and improved, not only fluorescence in a specific wavelength range is obtained using an optical filter as in a conventional method, but also fluorescence can be spectrally detected using a dispersion element such as a grating (diffraction grating), etc., and the wavelength characteristic data (spectrum) of fluorescence can be obtained.

For example, Japanese Published Patent Application No. Hei 8-43739 discloses a method of detecting a desired wavelength by dispersing fluorescence from a sample by a grating and leading it to a detector.

Additionally, U.S. 2002/21440 discloses the configuration of dispersing fluorescence from a sample by a prism and leading it to a detector. By changing the incident angle of the fluorescence entering a prism and continuously changing the range of a wavelength entering the detector, the spectral distribution of the fluorescence can be measured.

According to US2002/21440, a fluorescent spectrum can be continuously measured. However, the case in which a sample dyed with multiple dyes is pumped by an excitation light having two or more wavelengths, and the fluorescence is to be spectrally observed is not referred to in the documents of the prior art.

SUMMARY OF THE INVENTION

A fluorescence detection apparatus which is one of the aspects of the present invention, irradiates a sample with an excitation light having different wavelengths, and spectrally detects the fluorescence from the sample includes: a comparison unit for comparing the wavelength of the excitation light with a starting wavelength of a fluorescent spectrum detection bandwidth of the fluorescence detection apparatus; and a determination unit for determining an excitation light irradiation timing such that the irradiation of the excitation wavelength is stopped when the wavelength of the excitation light is longer than the starting wavelength.

Preferably, the fluorescence detection apparatus further includes a setting unit for setting the width of the detection bandwidth of the fluorescent spectrum, an amount of a detecting step, and the range of a fluorescent spectrum to be detected, and the determination unit controls the excitation light irradiation timing based on the detection bandwidth of the fluorescent spectrum set by the setting unit and the range of the fluorescent spectrum.

Preferably, in the fluorescence detection apparatus, the determination unit stops irradiation also when the excitation wavelength is in a predetermined offset range on the side of a wavelength shorter than the starting wavelength of the detection bandwidth.

A fluorescence detection method which is one of the aspects of the present invention, irradiates a sample with an excitation light having different wavelengths, and spectrally detects the fluorescence from the sample includes: comparing the wavelength of the excitation light with a starting wavelength of a fluorescent spectrum detection bandwidth of the fluorescence detection apparatus; stopping irradiation when the wavelength of the excitation light is longer than the starting wavelength; and determining the irradiation timing of the excitation light.

Preferably, the fluorescence detection apparatus is a laser scanning confocal microscope apparatus including a laser beam source generating a laser beam as an excitation light, and an optical scanning mechanism for scanning a sample using a laser beam.

A fluorescence detection method which is one of the aspects of the present invention is a record medium storing a computer-readable program for irradiating a sample with an excitation light having different wavelengths, and spectrally detecting the fluorescence from the sample, and includes: a comparing function of comparing the wavelength of the excitation light with a starting wavelength of a fluorescent spectrum detection bandwidth; and a determining function of determining the irradiation timing of the excitation light by stopping irradiation when the excitation wavelength of the excitation light is longer than the starting wavelength.

DESCRIPTION OF THE PREFERRED EMBODIMENTS

Figure 1:
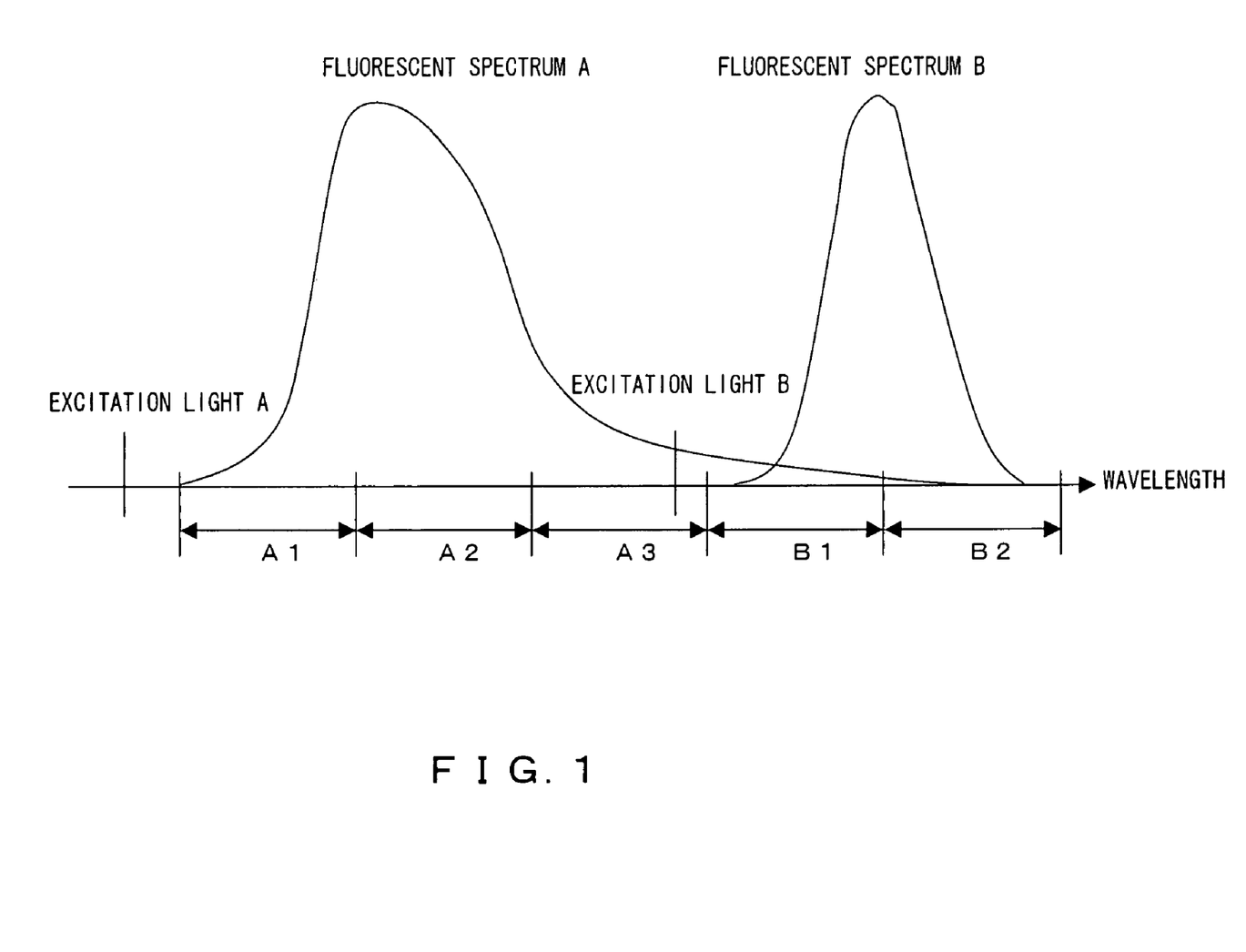
FIG. 1 is an explanatory view showing the relationship between a pumping wavelength and a fluorescent spectrum.

FIG. 1 shows the fluorescent spectra of two fluorescent dyes A and B and their pumping wavelengths. The excitation light A and the fluorescent spectrum A refer to the pumping wavelength and the fluorescent spectrum of the fluorescent dye A. The excitation light B and the fluorescent spectrum B refer to the pumping wavelength and the fluorescent spectrum of the fluorescent dye B. A1, A2, ..., and B2 show the ranges of the detection wavelengths for each process of spectral detection.

In the observation of the above mentioned double staining sample, the fluorescence of the wavelength ranges A1 through A3, B1, and B2 is sequentially detected by irradiating a sample with the excitation lights A and B.

In this case, since the fluorescence appears at a wavelength longer than the pumping wavelength, there is no significance in irradiating the sample with the excitation light B when the fluorescent spectrum A by the excitation light A is detected in the wavelength ranges A1 through A3. Irradiating a sample with unnecessary excitation lights causes fading of fluorescence.

In the example as shown in FIG. 1, when the fluorescent spectra A and B are close to each other, the excitation light B is an obstacle when the fluorescence A is detected, and the portion of the detection wavelength range A3 including the excitation light B cannot be observed. Therefore, in measuring a fluorescent spectrum, the portion of the range A3 lacks data.

According to the present invention, the sample dyed with two or more fluorescent dyes can be pumped with wasteful pumping with two or more excitation lights omitted. Additionally, the fluorescent spectrum can be continuously and spectrally observed.

The embodiments of the present invention are described below in detail by referring to the attached drawings. The embodiments described below show an example in which the present invention is applied to a laser scanning confocal point microscope apparatus which is an example of a fluorescence detection apparatus, but the present invention is not limited to a laser scanning confocal point microscope apparatus, but can be similarly applied to other fluorescence detection apparatuses.

Figure 2:
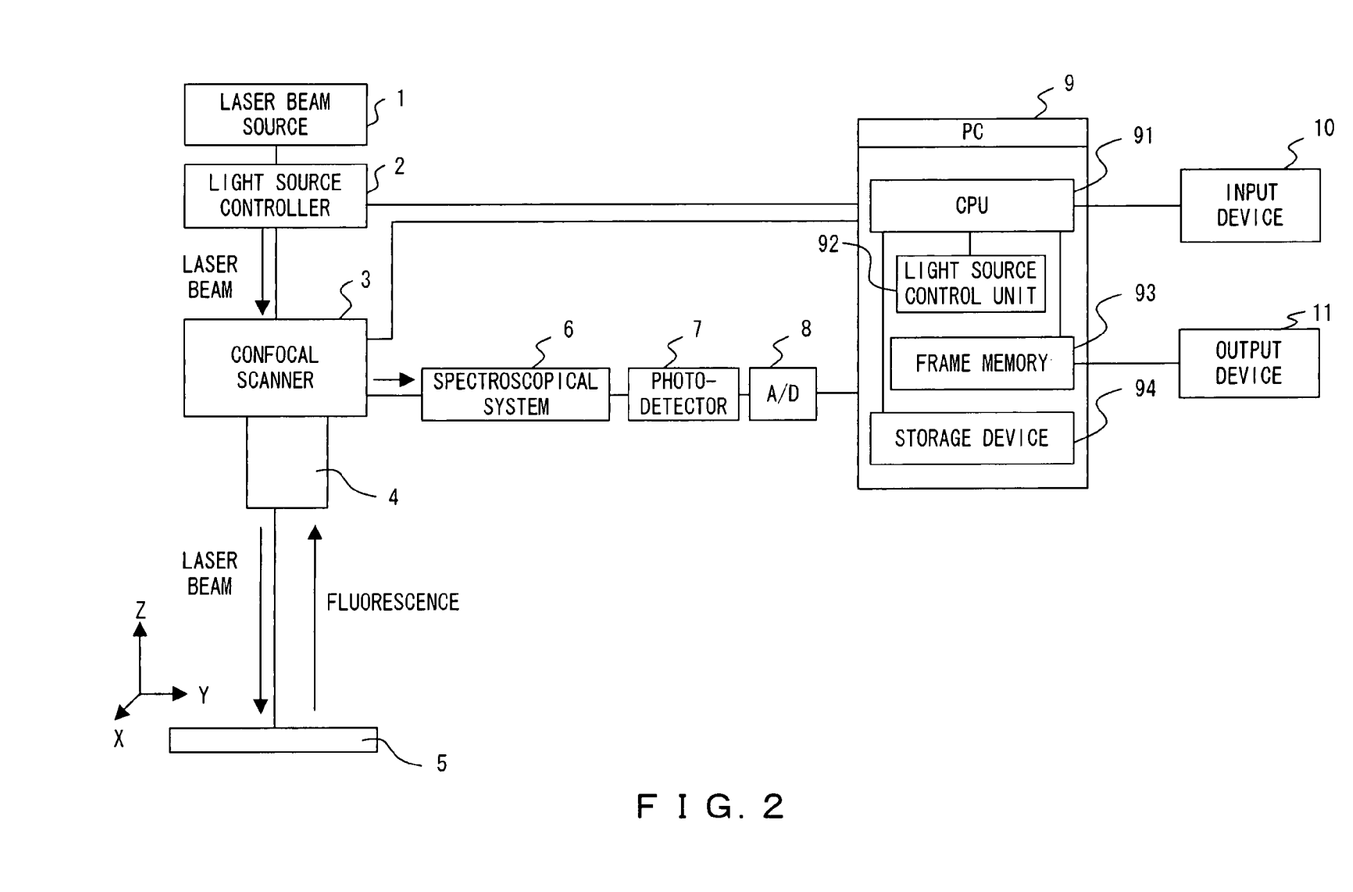
FIG. 2 is an explanatory view showing an example of a configuration of the scanning laser microscope to which the present embodiment is applied.

FIG. 2 shows an example of the configuration when the present invention is embodied as a laser scanning confocal point microscope apparatus. A laser beam source 1 outputs a laser beam for irradiating a test sample. The laser beam passes through a light source controller 2, deflected by a confocal scanner 3 in the X-Y direction, passes through an objective lens 4, and scans the test sample surface on a stage 5.

The light source controller 2 can preferably be an element of acoustical optics (for example, AOTF). The wavelength and the light quantity of a laser beam led to the confocal scanner 3 can be controlled by controlling the light source controller 2 using a light source control unit 92.

The confocal scanner 3 has a galvanomirror or a resonant scanner for scanning in the X axis direction and a galvanomirror for scanning in the Y axis direction for use in performing two-dimensionally scanning a test sample using a laser beam from the laser beam source 1. By changing the angle of these X and Y scanners, a spot of the laser beam XY-scans the test sample. The confocal scanner 3 can also perform the controlling operation by a CPU 91 of the PC 9.

The objective lens 4 collects laser beams for two-dimensional scanning through the confocal scanner 3, and forms a beam spot on the test sample on the stage 5. Then, the fluorescence from the test sample returns to the confocal scanner 3 through the objective lens 4. The fluorescence is deviated from the optical path of the laser beam in the confocal scanner 3, and lead to a spectroscopical system 6.

The spectroscopical system 6 disperses the fluorescence from the test sample, converts it to spectrums, selects a desired wavelength range from the spectrums, and transmits it to a photodetector 7. A desired spectroscopical system 6 comprises an angle-variable reflective grating and a variable slit. The central wavelength of the spectrum for the variable slit is adjusted by the angle of the grating, and a detected wavelength width is adjusted by the width of the variable slit. As a dispersion element, a prism can also be used. The spectroscopical system 6 can also be controlled by the CPU 91 of the PC 9.

The photodetector 7 converts the fluorescence of the wavelength range selected by the spectroscopical system 6 to an electric signal depending on the light quantity. Furthermore, the spectroscopical system 6 can omit the variable slit and can detect a spectrum using an array type detector.

The electric signal obtained by optical-electrical conversion is converted to digital data by an A/D converter 8, and temporarily stored in the A/D converter 8.

The digital data temporarily stored in the A/D converter 8 is recorded in frame memory 93 through the CPU 91. The data recorded in the frame memory 93 is output to an output device 11 connected to the frame memory 93, and displayed on a display device such as a monitor, etc.

An input device 10 connected to the CPU 91 is used to input the conditions for a user acquiring an image (hereinafter referred to as image acquisition conditions) such as a scanning image area, a scanning starting wavelength ($\lambda$s), a scanning ending wavelength ($\lambda$e) a wavelength step width ($\lambda$st), a wavelength resolution ($\lambda$reso), and a wavelength of an available laser (ExWL1, ExWL2, ...). If a plurality of lasers are used, a plurality of wavelengths of the lasers are input. Each control parameter of the image acquisition conditions is not limited.

Memory 94 stores the optical intensity detection value detected by the photodetector 7 from a test sample, an image acquisition condition, etc. generated at an instruction of the input device 10.

The CPU 91, the frame memory 93, the memory 94, etc. can be a common personal computer.

A processing program which can be processed by a computer program described later is recorded on a record medium such as CD-ROM and the memory 94 such as a hard disk, etc. As necessary, the processing program is read to the memory of the personal computer and executed by the CPU for control of each device connected to the personal computer.

The record medium can be a storage device which is connected to a computer and provided for the computer functioning as a program server.

In this case, a transmission signal obtained by modulating a carrier wave by a data signal representing a control program is transmitted from a program server to a computer through a communication circuit, and the computer demodulates a received transmission signal and regenerates the processing program, thereby allowing the CPU to execute the processing program.

With the above mentioned configuration, when the confocal point laser scanning microscope apparatus inputs a control parameter which is a condition for obtaining an image, a detection area of a fluorescent spectrum and the range of the fluorescent spectrum are set, an excitation light irradiates a test sample based on the settings to scan the test sample. Then, the fluorescence from the test sample is spectrally detected for each detection area, thereby obtaining an image.

Then, the relationship between the control parameter which is an input value input by the user through the input device 10 and the image obtained after scanning a detection area is explained below. Hereafter, [A, B) used in this specification indicates a value of A or larger and smaller than B.

First, a sample is scanned in the detection area from a scanning starting wavelength $\lambda$s to a detection area at $\lambda$s+$\lambda$reso, the fluorescence of the wavelength range [$\lambda$s, $\lambda$s+$\lambda$reso) is retrieved by the spectroscopical system 6 from the obtained fluorescence, thus obtaining an image. Then, the detection area is transferred from $\lambda$s+$\lambda$st to $\lambda$s+$\lambda$st+$\lambda$reso, and the second sample scanning is performed.

The fluorescence of the wavelength range [$\lambda$s+$\lambda$st, $\lambda$s+$\lambda$st+$\lambda$reso] obtained by the scanning is represented as an image based on the data retrieved by the spectroscopical system 6. When the "i" time scanning operation is terminated, the wavelength range can be represented as [$\lambda$s+(i−1)$\lambda$st, $\lambda$s+(i−1)$\lambda$st+$\lambda$reso). Similarly, the fluorescence is represented as an image based on the data retrieved by the spectroscopical system 6.

The scanning operation is completed when the scanning result is obtained as represented by the following inequality (1).

$$\lambda s+(i-1)\lambda st+\lambda reso \geq \lambda e \qquad (1)$$

Figure 3:
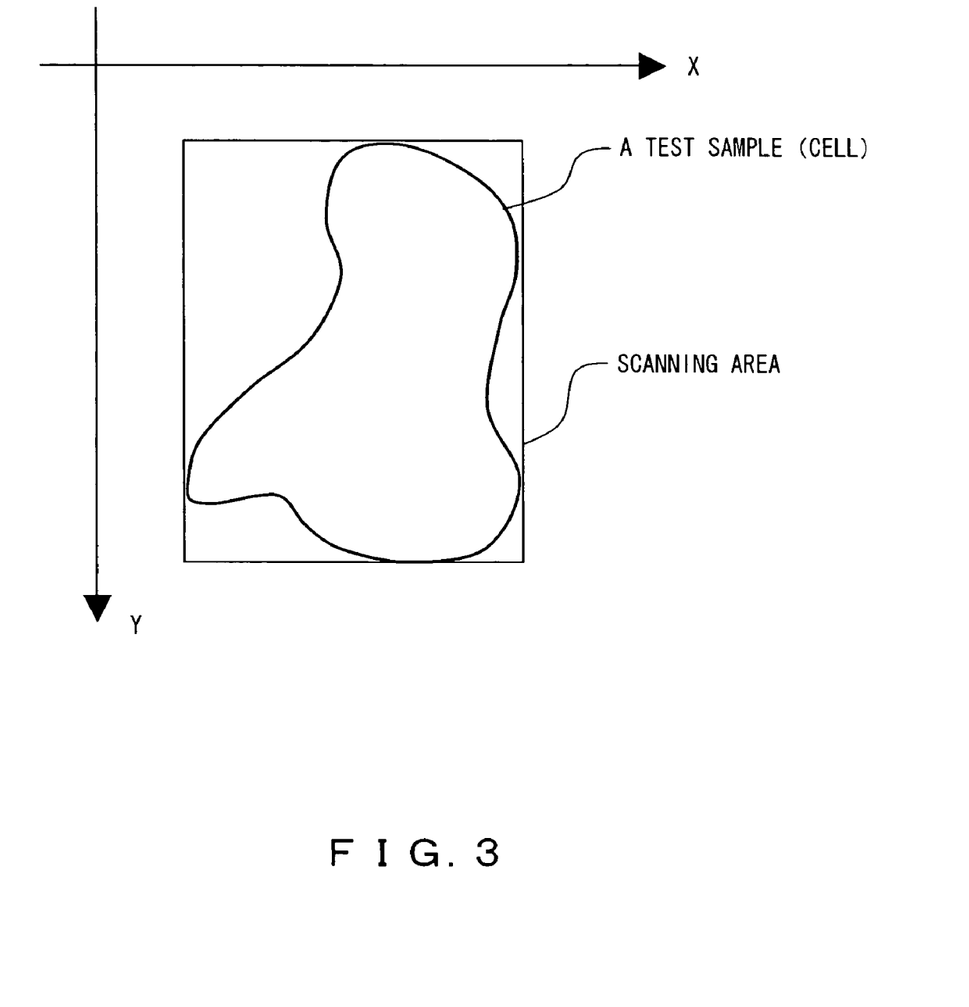
FIG. 3 is an explanatory view showing the relationship between a sample and a scanning range.

Then, as a practical example, the cell A as shown in FIG. 3 is pumped by the laser beam of the pumping wavelength of 488 nm, and the spectrally processed fluorescent image can be obtained as follows.

Assume that the control parameter of the image acquisition condition input by the user is represented as follows. In the present example, the pumping wavelength of the excitation light is 488 nm and 543 nm. The scanning starting wavelength $\lambda$s and the scanning ending wavelength $\lambda$e are set as wavelengths longer than the excitation light based on the characteristic by which a fluorescent spectrum appears on a wavelength longer than the excitation light, thereby setting the range of the fluorescent spectrum as $\lambda$s=490 nm and $\lambda$e=590 nm. It can also be set by calculating it based on the relationship between the excitation light and the fluorescent spectrum.

The wavelength step width $\lambda$st and the wavelength resolution $\lambda$reso can be determined by obtaining the specified number of images, or the largest possible number of images can be set. The method of setting the wavelength step width $\lambda$st and the wavelength resolution $\lambda$reso is not limited to the above mentioned method.

In this example, they are set as $\lambda$st=20 nm and $\lambda$reso=20 nm.

Figure 4:
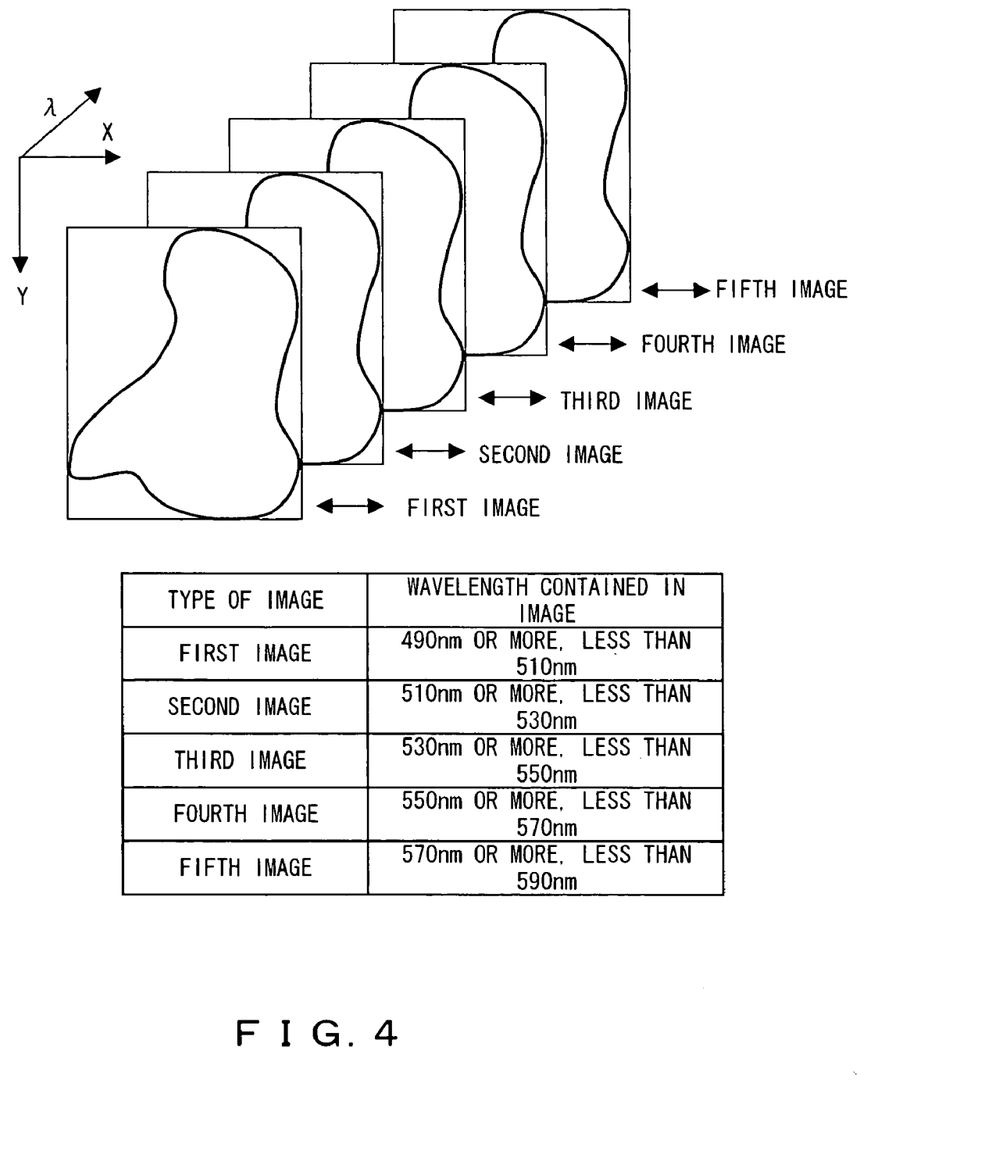
FIG. 4 is an explanatory view showing an example of a fetched image.

When the cell A is scanned under the above mentioned image acquisition condition, a total of five images can be obtained as shown in FIG. 4.

Figure 5:
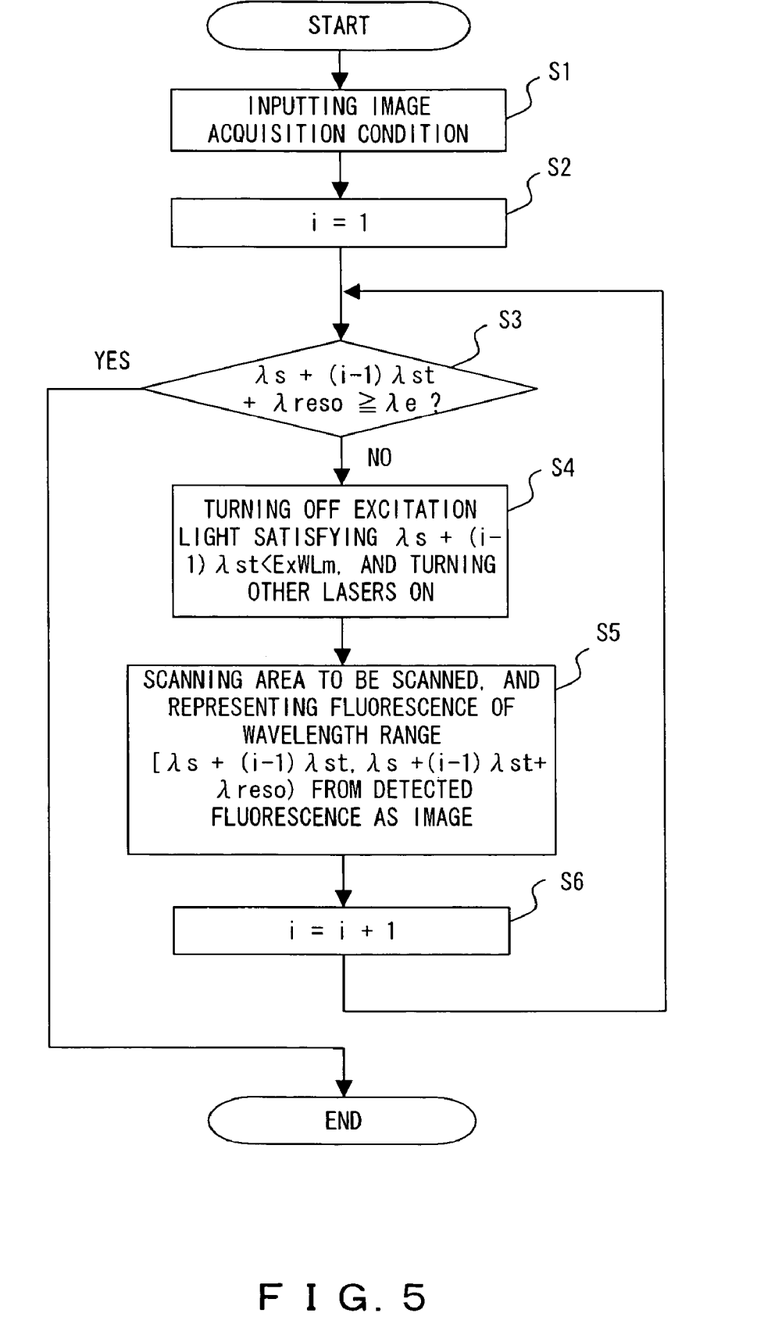
FIG. 5 shows a floe of the process of determining ON/OFF of an excitation light according to an embodiment of the present invention.

When the detail of obtaining a fluorescent image is explained by referring to the flowchart shown in FIG. 5, a control parameter which is an image acquisition condition is input using the input device 10 in step S1.

The above mentioned control parameters of $\lambda$s=490 nm, $\lambda$e=590 nm, $\lambda$st=20 nm, $\lambda$reso=20 nm, ExWL1=488 nm, and ExWL2=543 nm are input.

In step S2, 1 is substituted as the scanning frequency i for an initial value. The scanning frequency equals the number of obtained images, and 1 is substituted because it is the first scanning operation.

In step S3, it is checked whether or not the condition of the equation 1 holds. Based on the result, it is determined whether or not the scanning operation is to be completed. If the equation 1 holds, the operation is completed. If it does not hold, control is passed to step S4.

In step S4, the excitation light satisfying the equation 2 is turned OFF, and the excitation light not satisfying it is turned ON.

$$\lambda s+(i-1)\lambda st < ExWLm (m=1, 2, \ldots) \qquad (2)$$

Turning ON/OFF the excitation light is performed by the light source controller 2 by an instruction from the light source control unit 92. In the input example in step S1, ExWL1 is ON and ExWL2 is OFF until the scanning frequency is i≦3. Practically, since 490 nm+40 nm>488 nm, ExWL1 is ON and ExWL2 is OFF.

When the scanning frequency ≧4, both ExWL1 and ExWL2 are ON. Practically, since 490 nm+60 nm>488 nm, and 490 nm+60 nm>543 nm, both ExWL1 and ExWL2 are ON.

The inequality in step S4 is based on the principle that the fluorescence appears only on a wavelength longer than the wavelength of the excitation light.

Then, in step S5, based on the fluorescence data obtained by scanning a scanning area, the fluorescence data of the wavelength range of [$\lambda$s+(i−1) $\lambda$st, $\lambda$s+(i−1)$\lambda$st+$\lambda$reso) is represented as an image. An image is represented each time a scanning operation is performed, but it can be represented after completing the entire scanning process.

In step S6, the scanning frequency is incremented, control is returned to step S3, and it is checked again whether or not the condition of the equation 1 holds. if it holds, the process terminates. In the present example, five images are obtained.

In the present embodiment, when a sample is pumped by a plurality of excitation lights and the fluorescence is spectrally observed, the progress of the fading of fluorescence can be delayed and the test sample can be protected against damage by suppressing the irradiation of an unnecessary excitation light on the sample.

When excitation lights of two or more different wavelengths are used, the spectrum data of the fluorescence can be continuously obtaind without a loss although one of the pumping wavelengths can be overlapping in the measurement wavelength range of fluorescence.

EXAMPLE OF VARIATION 1

In step S4 shown in FIG. 5, in the excitation lights not satisfying the equation 2, all the excitation lights are not turned ON, but they can be selectively turned ON.

According to the present embodiment, when a sample is pumped using a plurality of excitation lights and the fluorescence is spectrally observed, the influence of the fluorescent spectrum generated by pumping others can be obtained.

EXAMPLE OF VARIATION 2

In step S4 shown in FIG. 5, the equation 2 can be amended to the equation 3.

$$\lambda s+(i-1)\lambda st < ExWLm + \lambda offset \qquad (3) \lambda \ldots offset \geq 0$$

Thus, although there is a certain width of an output wavelength of an excitation light, there is no excitation light to be fetched. For example, the maximum output wavelength of an excitation light is 488 nm. If a laser output with a wavelength about 5 nm less or more than 488 nm is used as an excitation light, an offset range λoffset is prepared for a control parameter, and λoffset=5 nm is set.

By the equation 3 using the control parameter λoffset, the process in step S4 shown in FIG. 5 is performed. Thus, the fluorescent spectrum of a wavelength of an excitation light is protected against fetching. The value of λoffset can be a value for each pumping laser, or the same value.

Although the spectral performance of a spectroscopical system is insufficient and the excitation light cannot be completely cut off only in the wavelength range a little far from the laser wavelength, an excitation light can be prevented from being mixed by using the above mentioned control parameter λoffset.

The present invention can be embodied by allowing the CPU to perform the process shown in the flowchart in FIG. 5 by generating a control program for the CPU of a standard computer as described above, recording the program in a computer-readable record medium, and reading the program from the record medium to the computer.

Figure 6:
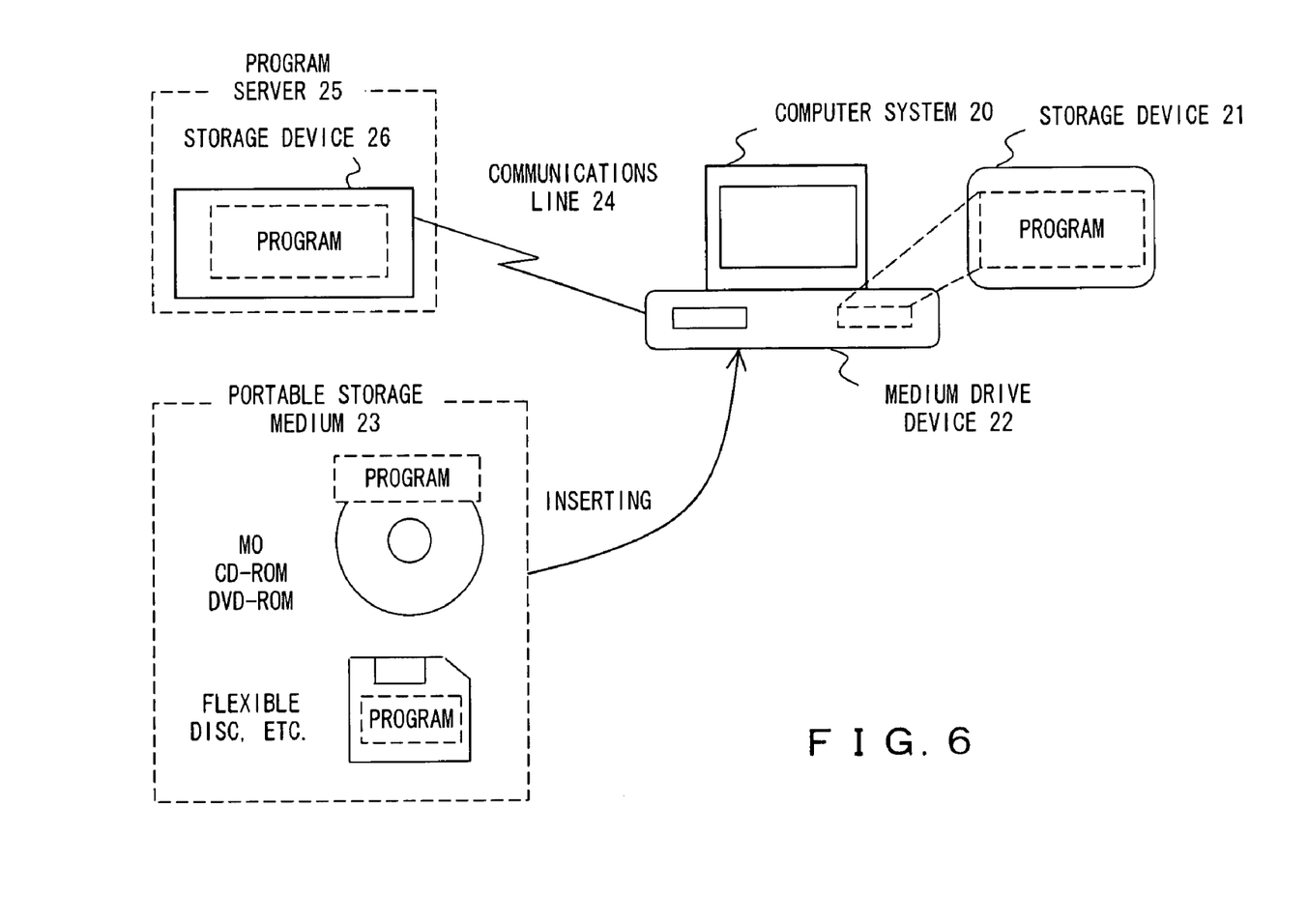
FIG. 6 shows an example of a record medium storing a computer-readable control program.

FIG. 6 shows an example of a record medium from which a recorded control program can be read in a computer system. The record medium can be a storage device 21 such as ROM, a hard disk, etc. provided as built-in or external accessory devices for a computer system 20, a portable record medium 23, etc. such as a flexible disk, a MO (magneto-optical disk), CD-ROM, DVD-ROM, etc. from which a recorded control program can be read by inserting into a medium drive device 22 provided for the computer system 20.

Furthermore, it can be a storage device 26 which is connected to the computer system 20 through a communication line 24 and functions as a program server 25. In this case, a transmission signal obtained by modulating a carrier wave by a data signal representing a control program is transmitted from the program server 25 to the computer system 20 through the communication circuit line 24, and the computer system 20 demodulates the received transmission signal, and regenerates a control program, thereby allowing the control program to be executed by the CPU of the computer system 20.

In the above mentioned embodiment, the fluorescent dye for a sample or the fluorescent protein incorporated into a sample can be protected against fading. When a plurality of excitation light are used, fluorescent spectrums can be continuously detected.

Furthermore, the present invention can be improved and modified in various manners within the gist of the present invention without limiting the applications to the above mentioned embodiments.

What is claimed is:

1. A fluorescence detection apparatus which irradiates a sample with an excitation light having different wavelengths, and spectrally detects fluorescence from the sample, comprising:
    a comparison unit comparing each wavelength of the excitation light with a starting wavelength of a fluorescent spectrum detection bandwidth of the fluorescence detection bandwidth; and
    a determination unit determining an excitation light irradiation timing such that irradiation of the excitation wavelength is stopped when the wavelength of the excitation light is longer than the starting wavelength.

2. The apparatus according to claim 1, further comprising a setting unit setting a width of the detection bandwidth of the fluorescent spectrum, an amount of a detecting step, and a range of a fluorescent spectrum to be detected, wherein
    the determination unit controls excitation light irradiation timing based on the detection bandwidth of the fluorescent spectrum and the range of the fluorescent spectrum set by the setting unit.

3. The apparatus according to claim 1, wherein
    the determination unit stops irradiation also when the excitation wavelength is in a predetermined offset range on a side of a wavelength shorter than the starting wavelength of the detection bandwidth.

4. The apparatus according to claim 1, wherein
    the apparatus is a laser scanning confocal microscope apparatus, comprising:
    a laser beam source generating a laser beam as the excitation light; and
    an optical scanner for scanning the sample using the laser beam.

5. A fluorescence detection method of irradiating a sample with an excitation light having different wavelengths, and spectrally detects fluorescence from the sample, comprising:
    comparing a wavelength of the excitation light with a starting wavelength of a fluorescent spectrum detection bandwidth; and
    stopping irradiation when the wavelength of the excitation light is longer than the starting wavelength, and determining irradiation timing of the excitation light.

6. A computer-readable record medium storing a program for irradiating a sample with an excitation light having different wavelengths, and spectrally detecting the fluorescence from the sample by directing a computer to perform a process comprising:
    a comparing function of comparing each wavelength of the excitation light with a starting wavelength of a fluorescent spectrum detection bandwidth; and
    a determining function of determining irradiation timing of the excitation wavelength by stopping irradiation when the wavelength of the excitation light is longer than the starting wavelength.

7. A fluorescence detection apparatus which irradiates a sample with an excitation light having different wavelengths, and spectrally detects the fluorescence from the sample, comprising:
    a spectroscopical system converting the fluorescence to a spectrum;
    a measurement unit detecting the fluorescent spectrum formed by the spectroscopical system for each detection bandwidth from a starting wavelength to an ending wavelength;
    comparison means for comparing each wavelength of the excitation light with the starting wavelength of the detection bandwidth; and
    determination means for determining irradiation timing of the excitation light such that irradiation of the excitation wavelength is stopped when the wavelength is longer than the starting wavelength.

8. The apparatus according to claim 7, wherein the determination means stops irradiation of the wavelength of the excitation light also when the wavelength is in a predetermined offset range on a side of a wavelength shorter than the starting wavelength.

9. The apparatus according to claim 7, wherein the apparatus is a laser scanning confocal microscope apparatus, comprising:

a laser beam source generating a laser beam as the excitation light; and
an optical scanner for scanning a sample using the laser beam.

* * * * *